F. G. P. LEAÓ.
APPARATUS FOR DEHYDRATING OR DESICCATING AIR FOR INDUSTRIAL PURPOSES.
APPLICATION FILED FEB. 10, 1913.
1,132,194. Patented Mar. 16, 1915.
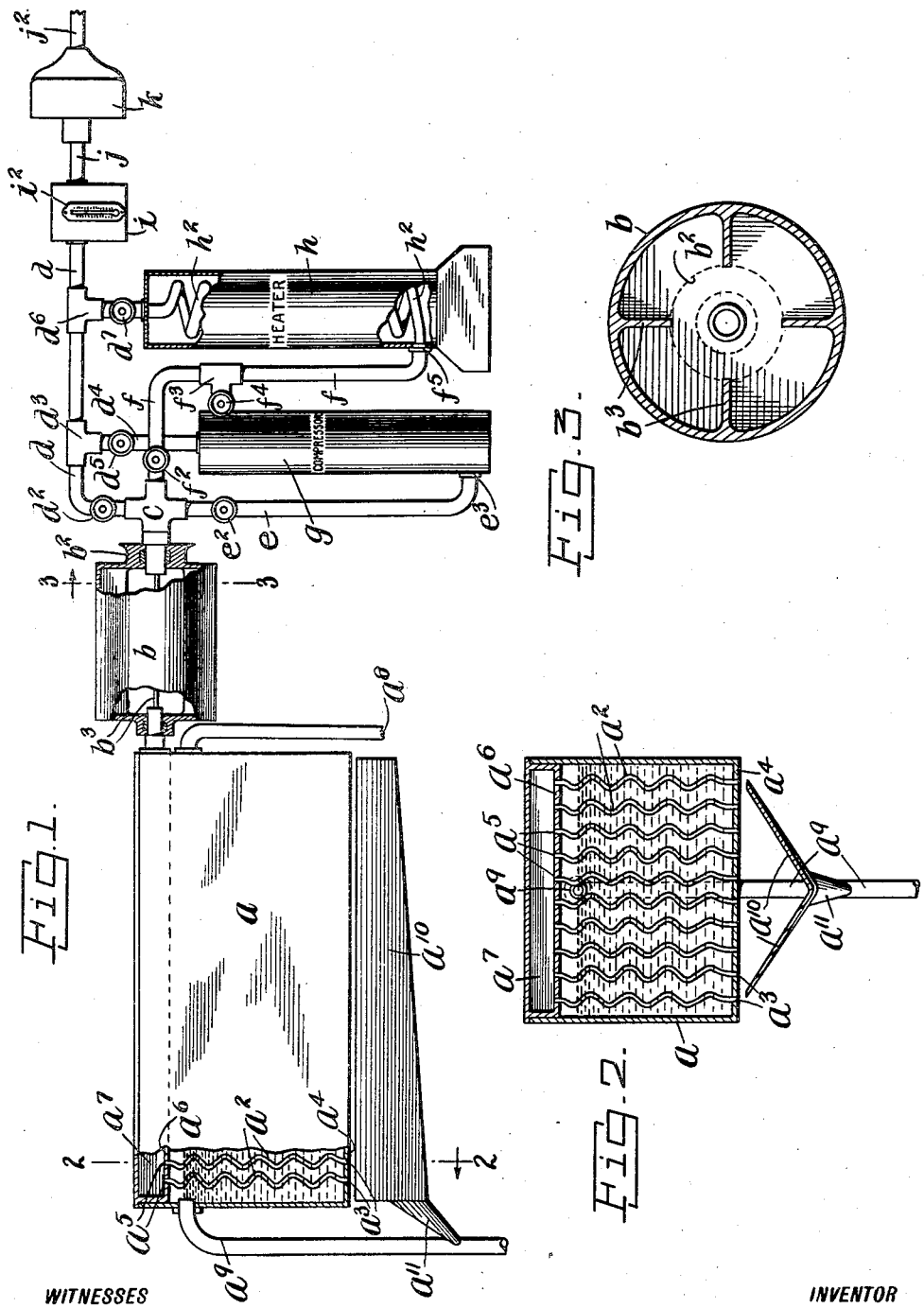
WITNESSES
H. E. Thompson
S. Andrews
INVENTOR
Francisco Garcia P. Leaó,
BY
Edgar Tate & Co.
ATTORNEYS

UNITED STATES PATENT OFFICE.

FRANCISCO GARCIA P. LEAÓ, OF NEW YORK, N. Y.

APPARATUS FOR DEHYDRATING OR DESICCATING AIR FOR INDUSTRIAL PURPOSES.

1,132,194. Specification of Letters Patent. Patented Mar. 16, 1915.

Application filed February 10, 1913. Serial No. 747,318.

*To all whom it may concern:*

Be it known that I, FRANCISCO GARCIA P. LEAÓ, a citizen of Brazil, and residing at New York, in the county of New York and State of New York, have invented certain new and useful Improvements in Apparatus for Dehydrating or Desiccating Air for Industrial Purposes, of which the following is a specification, such as will enable those skilled in the art to which it appertains to make and use the same.

This invention relates to apparatus for dehydrating or desiccating air for use in drying or desiccating fruits, vegetables or other articles or substances, and the object thereof is to provide an apparatus of this class which is simple in construction and efficient in operation and by means of which air for use in drying or desiccating apparatus of various kinds and classes may be properly and speedily prepared for such use, and also heated or not as may be desired; and with these and other objects in view the invention consists in an apparatus of the class specified constructed as hereinafter described and claimed.

The invention is fully disclosed in the following specification of which the accompanying drawing forms a part in which the separate parts of my invention are designated by suitable reference characters in each of the views, and in which:—

Figure 1 is a side elevation of an apparatus involving my invention, part of the construction being shown in section;—Fig. 2 a vertical transverse section on the line 2—2 of Fig. 1, and Fig. 3 a similar section on the line 3—3 of Fig. 1.

In the practice of my invention, as shown in the drawing, I provide a condenser $a$ comprising a suitable tank which is oblong and rectangular in form, in the construction shown, and in which is placed a plurality of spirally curved tubes $a^2$ which extend through or communicate with apertures $a^3$ in the bottom $a^4$ of the tank, and with corresponding apertures $a^5$ in the top $a^6$ of the tank, and at the top of the tank $a$ is an air chamber $a^7$ into which air passing through the tubes $a^2$ is discharged, and communicating with one end portion of the tank $a$ preferably near the top thereof is a water inlet pipe $a^8$ and communicating with the opposite end portion thereof at the top thereof is an outlet pipe $a^9$, and below the tank $a$ is placed a trough $a^{10}$ to receive the water of condensation from the tubes $a^2$, and this trough $a^{10}$ is provided with a discharge $a^{11}$ which communicates, in the form of construction shown, with the outlet pipe $a^9$.

Connected with and in communication with one end portion of the casing that forms the air chamber $a^7$ is a moisture absorbing drum $b$ provided at one end with a pulley wheel $b^2$ by which it may be rotated or turned by a belt driven in any suitable way, and the drum $b$ is provided in its inner side and longitudinally and radially thereof with baffle plates $b^3$, and, in practice, the drum $b$ is partially filled with salt, lime, sulfuric acid, or any similar or equivalent substance or substances that will absorb the moisture in air.

Connected with and in communication with the end of the drum $b$ opposite the condenser is a four-way coupling $c$ with which are connected pipes $d$, $e$ and $f$, and the pipes $d$, $e$ and $f$ are provided with valves $d^2$, $e^2$ and $f^2$, and connected with the pipe $d$ at $d^3$ is a branch pipe $d^4$ provided with a valve $d^5$ and in communication with an air compressor $g$, and the pipe $f$ is provided with a branch pipe $f^3$ which communicates with the top of the compressor $g$, in the construction shown, and the branch pipe $f^3$ is provided with a valve $f^4$. The pipe $e$ communicates at $e^3$ with the bottom of the compressor $g$, in the form of construction shown, and the pipe $f$ also communicates with an air heater $h$ at $f^5$, and the pipe $d$ is provided with a branch pipe $d^6$ which communicates with the top of the heater $h$, and said pipe $d^6$ is provided with a valve $d^7$. The heater $h$ comprises an ordinary shell or casing having a coil $h^2$ which connects with the pipes $f$ and $d^6$, and any suitable burner may be placed in the bottom of the shell or casing $h$, or any suitable means employed for heating the coil $h^2$. The pipe $d$ is extended beyond the heater connection $d^6$ and connected therewith is a temperature registering device or indicator $i$ consisting, in the form of construction shown, of a box or casing provided with a thermometer $i^2$, and connected with said box or casing is a discharge pipe $j$ with which is connected, in the form of construction shown, a suction fan or similar device $k$ provided with a supplemental discharge pipe $j^2$.

My invention, as hereinbefore stated, is intended to prepare air for use in an apparatus or plant for drying or desiccating fruits, vegetables, or any other articles or substances including liquids, and when the air dehydrating or desiccating apparatus herein shown and described is connected with the drying or desiccating apparatus referred to, the suction pump or similar device $k$ will not be necessary, as said drying or desiccating apparatus itself will be provided with means for drawing the air through my improved air desiccating or dehydrating apparatus herein shown and described, and in such cases, the compressor $g$ may not always be necessary, and said compressor $g$ may or may not be employed, as may be desired, and when not necessary, or when it is not desired to use said compressor, it may be cut out by means of the valves $d^5$, $e^2$ and $f^4$. It will also be understood that the air compressor $g$ may be of any form or construction, and as the details thereof form no part of my invention, the said air compressor is only indicated in the accompanying drawing.
The temperature regulator part of the apparatus consists of the heater $h$ and its connections and the pipes $d$ and $d^6$, with the valves $d^2$ and $d^7$, and by means of these valves the amount of cold air passing through the pipe $d$ and the hot air passing through the pipes $d^6$ may be regulated as will be readily understood, and the temperature of this air may be determined by the temperature indicator $i$, and said temperature indicator may also be of any desired construction.

In practice, cold water is fed into the tank $a$ through the pipe $a^8$ under pressure and is discharged from said tank through the pipe $a^9$, and these pipes may be provided with suitable valves to control the flow of water into and from said tank. It will be understood that air is constantly passing through the tubes $a^2$ into the air chamber $a^7$, when the apparatus is in operation, and much of the moisture in said air is condensed on the inner walls of the tubes $a^2$, and this condensation passes downwardly through said tubes into the troughs $a^{10}$. The air entering the chamber $a^7$ passes into the drum $b$ the rotation of which constantly agitates the absorbing material therein and said air and mingles said air and said material, and the remaining moisture in the air is abstracted therefrom, and said air may be passed from the drum $b$ through the pipe $d$ into the temperature indicator $i$, or through the pipe $f$ and through the heater into said temperature indicator, or the said air may be passed from the absorbing drum through the pipe $e$, through the compressor $g$ and through the pipes $d^4$ and $d$ into the temperature indicator, or the said air may be passed from the condensing drum $b$ through the pipe $e$, the compressor $g$ and through the pipe $f$ and the heater $h$ and the pipe $d$ into the temperature indicator, or by means of the pipe connections shown, the air may be passed from the moisture absorbing drum $b$ to the indicator in any desired way, and with or without passing said air through the compressor $g$, or the heater $h$, and the air entering the temperature indicator $i$ is perfectly pure and free from moisture.

In the operation of this apparatus, the heater $h$ and the compressor $g$ together, operate as a temperature regulator when both are employed, and when said parts are connected with each other and with the moisture absorbing drum $b$, as herein shown and described, but my invention is not limited to the exact construction, combination and arrangement of parts herein shown and described, and changes therein and modifications thereof may be made, within the scope of the appended claims, without departing from the spirit of my invention or sacrificing its advantages.

Having fully described my invention what I claim as new and desire to secure by Letters Patent is;—

1. In an air dehydrating apparatus, a condenser, a moisture absorbing device connected with said condenser, a temperature indicator connected with said moisture absorbing device, a heater also connected with said moisture absorbing device and said temperature indicator, and means for controlling the flow of air from the moisture absorbing device directly to the temperature indicator and through the heater to said indicator.

2. In an apparatus for dehydrating air, a condenser, a moisture absorbing device connected with said condenser, a temperature indicator connected with said condenser, a heater connected with said temperature indicator and said moisture absorbing device, and a compressor connected with the moisture absorbing device, the temperature indicator and the heater substantially as shown and described.

3. In an air dehydrating apparatus, a condenser, a moisture absorber, and a temperature regulator consisting of a compressor and a heater in operative connection with each other and with said moisture absorber.

In testimony that I claim the foregoing as my invention I have signed my name in presence of the subscribing witnesses this 6th day of February 1913.

FRANCISCO GARCIA P. LEAÓ.

Witnesses:
C. MULREANY,
S. ANDREWS.